Patented May 6, 1941

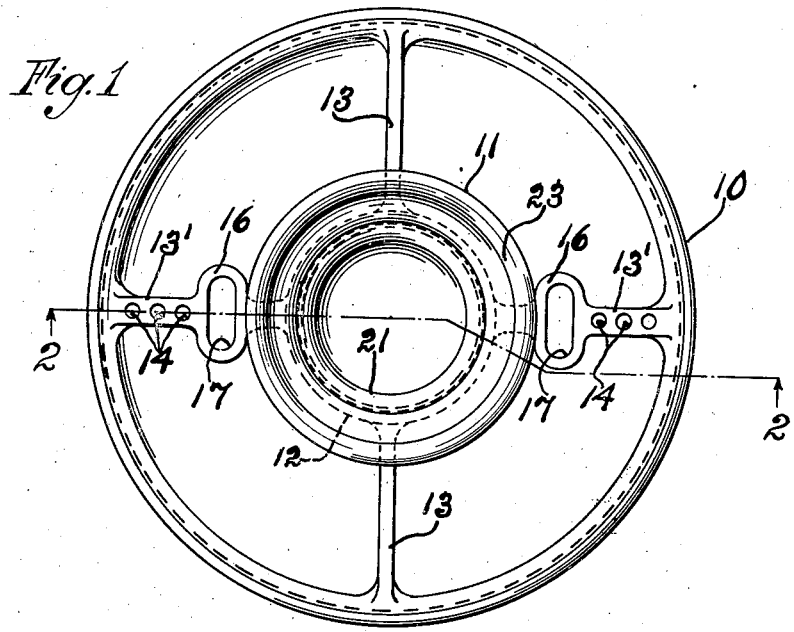
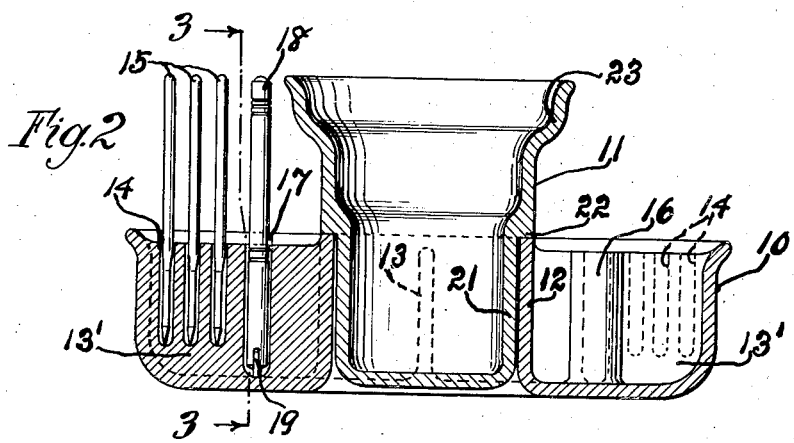
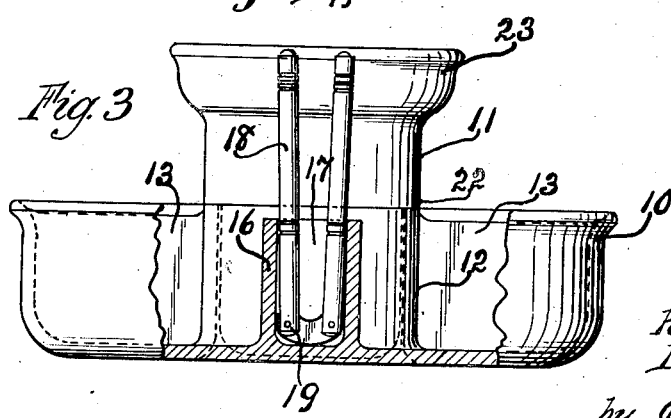
Inventors,
Kurt C. Gehring
Bernice Gehring
by J. Daniel Stuwe
Attorney.

2,240,842

UNITED STATES PATENT OFFICE 2,240,842

COMBINATION NUT BOWL WITH REMOVABLE NUT SHELL CONTAINER

Kurt C. Gehring and Bernice Gehring, Chicago, Ill.

Application January 15, 1940, Serial No. 313,844

2 Claims. (Cl. 65—15)

This invention relates to a novel and efficient combination nut bowl with removable nut shell container.

One of the main objects of this invention is to provide a practical and highly efficient combination nut bowl and nut shell container, wherein the bowl is arranged for containing several different kinds of nuts, or likewise candies, fruits, or other articles of food, all being properly separated so that each kind is readily accessible; and wherein the container for the shells or other cast-off parts is conveniently placed for receiving the same, and is furthermore adapted to be readily removed from the bowl, so that said shells or parts can be easily dumped therefrom.

Another object of this invention is to provide such a combination device which is arranged to support nut picks and nut crackers placed to have their handle portions extended, so that they can be readily grasped in the hand in the proper position for practical use.

A further object of this invention is to provide such a device which has its various parts advantageously arranged, so that it is economical in construction, convenient in operation, and highly efficient in use.

These and various other objects and advantages are attained with this invention, as will become apparent from the following description, taken in connection with the accompanying drawing wherein it is shown in its preferred form of construction, it being obvious that other forms and arrangements may be resorted to for carrying out the objects and purposes of this invention.

In the drawing:

Fig. 1 is a plan view of our combination nut bowl with removable nut shell container.

Fig. 2 is a vertical sectional view thereof, taken substantially along line 2—2 of Fig. 1, and having a nut cracker and several nut picks mounted in conveniently graspable position therein.

Fig. 3 is a part sectional view and part elevational view, taken substantially along line 3—3 of Fig. 2.

In the drawing we have illustrated our invention in its preferred form of construction, and as shown it comprises a nut bowl 10 in combination with a nut shell container 11 which is removably mounted therein.

This form of our invention illustrated herein is more particularly adapted for serving several kinds of nuts, but it may likewise be utilized for serving several kinds of candies, fruits, and other articles of food. The bowl and the container can both be made of wood, imitation wood, metal, Bakelite, or any type of composition.

The bowl 10 comprises an integral neck or sleeve 12 at the central part of the body, which is preferably open at the bottom as well as at the top, forming a substantially cylindrical channel or shaft; and from this neck several ledges or partitions 13 extend outwardly, being preferably integral with the neck and the body of the bowl, thereby providing several separate compartments. Four such compartments and partitions are shown herein, for accommodating four kinds of nuts, or other articles of food, and retain the same properly separated; but the number of partitions and compartments will be varied to suit the demand.

One or more of these partitions or ledges 13, preferably the two opposite partitions 13' as shown herein, are provided each with several relatively deep and narrow pockets 14, adapted to receive and support the usual nut picks 15 therein; and such partition is further provided with an enlarged or bulging portion 16 containing an oblong pocket 17, adapted to support a nut cracker 18 therein.

It should be noted, and it may be seen from the drawing, that the pocket 17 is made oblong and is of the proper size to have the nut cracker 18 placed therein with its hinged end 19 at the bottom, in order that the hand can conveniently and will naturally grasp the protruding handle part of the nut cracker in the proper manner, and will thus withdraw it ready for use. The pockets 14 are likewise arranged to receive the pointed ends of the nut picks 15 therein, as shown in Fig. 2, thus also facilitating their withdrawal.

The container or receptacle 11 for the nut shells is substantially cup-shaped, and its lower part 21 fits snugly in the sleeve 12. It is provided with a peripheral shoulder 22 on its intermediate part which rests upon the top edge of said sleeve, thus placing the bottom of said part 21 about flush with the bottom of the bowl. The upper part 23 of this container is flared or spreading outward, to facilitate the throwing of nut shells or other cast-off parts therein.

By the use of this improved device the various kinds of nuts, or other articles of food, are thus properly separated and are conveniently accessible at all times. Furthermore, the nut shells or other cast-off parts of food can be easily dropped into the flared top part 23 of this container 11, and the latter when filled can be lifted readily from the bowl and the shells dumped out, without disturbing the bowl or its contents of nuts and other food. It is also apparent that the nut crackers and nut picks are properly supported on this device, that they will be easily grasped by the hand so as to be ready for use in cracking nuts, and that this construction provides a very convenient and efficient combination nut bowl with removable nut shell container.

We claim:

1. A combination nut bowl and nut shell container, comprising a bowl containing an outer wall and a central sleeve being of substantially equal height and a plurality of partitions extending outward from the sleeve to the bowl wall, to provide a plurality of separate compartments, at least one of said partitions being provided with relatively deep and narrow pockets to support nut picks therein and also containing a larger pocket which is oblong in cross-section for supporting the hinged end part of a nut cracker therein, so as to have its handle extended to be easily grasped by the hand and withdrawn ready for use, and a nut shell container removably mounted in said sleeve adapted to be readily withdrawn and emptied.

2. A nut serving device of the character described, comprising a bowl containing an upright outer wall with an upright sleeve centrally thereof and a plurality of partitions extending radially therefrom to the bowl wall and being integral with the sleeve and bowl, to provide a plurality of separate compartments, at least one of said partitions containing several relatively narrow and deep pockets for supporting nut picks therein with the handles extending upward and also containing a larger pocket which is oblong in cross-section for receiving the hinged end part of a nut cracker therein, so as to have its handle part extend upward therefrom and in position to be easily grasped by the hand and withdrawn ready for use in cracking nuts, and a nut shell container having a cup-shaped lower part fitting snugly but removably in said sleeve and having a shoulder thereabove resting upon the upper end of the sleeve, said container also having a flared upper part to facilitate casting the nut shells therein.

KURT C. GEHRING.
BERNICE GEHRING.